United States Patent [19]
Lozier et al.

[11] Patent Number: 5,223,692
[45] Date of Patent: Jun. 29, 1993

[54] METHOD AND APPARATUS FOR LASER TREPANNING

[75] Inventors: Todd B. Lozier, Hamilton, Ohio; James G. Kelley, California, Ky.

[73] Assignee: General Electric Company, Cincinnati, Ohio

[21] Appl. No.: 764,256

[22] Filed: Sep. 23, 1991

[51] Int. Cl.$^5$ ............................................. B23K 26/00
[52] U.S. Cl. ............................... 219/121.67; 219/121.72
[58] Field of Search ............ 219/121.7, 121.71, 121.72, 219/121.75, 121.68, 121.64, 121.67

[56] References Cited

U.S. PATENT DOCUMENTS

| | | | |
|---|---|---|---|
| 3,576,965 | 5/1971 | Gugger | 219/121 |
| 4,017,965 | 4/1977 | Brutsch et al. | 219/121.69 X |
| 4,547,651 | 10/1985 | Maruyama | 219/121.67 |
| 4,737,613 | 4/1988 | Frye | 219/121.67 |
| 4,896,944 | 1/1990 | Irwin et al. | 219/121.75 X |
| 4,937,424 | 6/1990 | Yasui et al. | 219/121.6 |
| 5,043,553 | 8/1991 | Corfe et al. | 219/121.7 |
| 5,117,087 | 5/1992 | Baker et al. | 219/121.71 |

FOREIGN PATENT DOCUMENTS

1-228692  9/1989  Japan .

*Primary Examiner*—C. L. Albritton
*Attorney, Agent, or Firm*—Charles L. Moore, Jr.; Jerome C. Squillaro

[57] ABSTRACT

An improved method and apparatus for laser trepanning a passage through a workpiece, gas turbine engine component or the like includes the method steps of: providing a linearly polarized beam of laser energy; focusing the laser beam on a selected location on the component; moving one of the laser beam or the workpiece relative to one another along a first selected trepanning path and along a second selected trepanning path, which is substantially opposite in direction to the first selected path, to compensate for the linear polarization of the laser beam and to reduce the processing time. The steps of moving one of the laser beam or the workpiece along the first and second trepanning paths are repeated until a passage is cut to a desired depth into the surface of the component or the passage is cut entirely through the component. An apparatus for accomplishing the method of the present invention includes a laser system for generating a linearly polarized beam of laser energy and a manipulator arrangement for moving one of the laser system or the component relative to one another. The apparatus further includes a computer controller which is programmed to move either the laser system or the component along the first and second selected trepanning paths.

27 Claims, 5 Drawing Sheets

METHOD AND APPARATUS FOR LASER TREPANNING

BACKGROUND OF THE INVENTION

The present invention relates to material processing using a laser beam and, more particularly, to an improved method and apparatus for material processing, such as drilling, cutting, machining or the like, using an improved multi-pass laser trepanning method.

The use of lasers for material processing are finding wider applications in industry. The $CO_2$ laser and the yttrium-aluminum-garnet (YAG) face-pumped laser (FPL) are particularly suitable for material processing of super alloys and other exotic materials currently being used in the manufacturing of high performance gas turbine engines for use in aircraft propulsion as well as other applications.

Figure 1A:
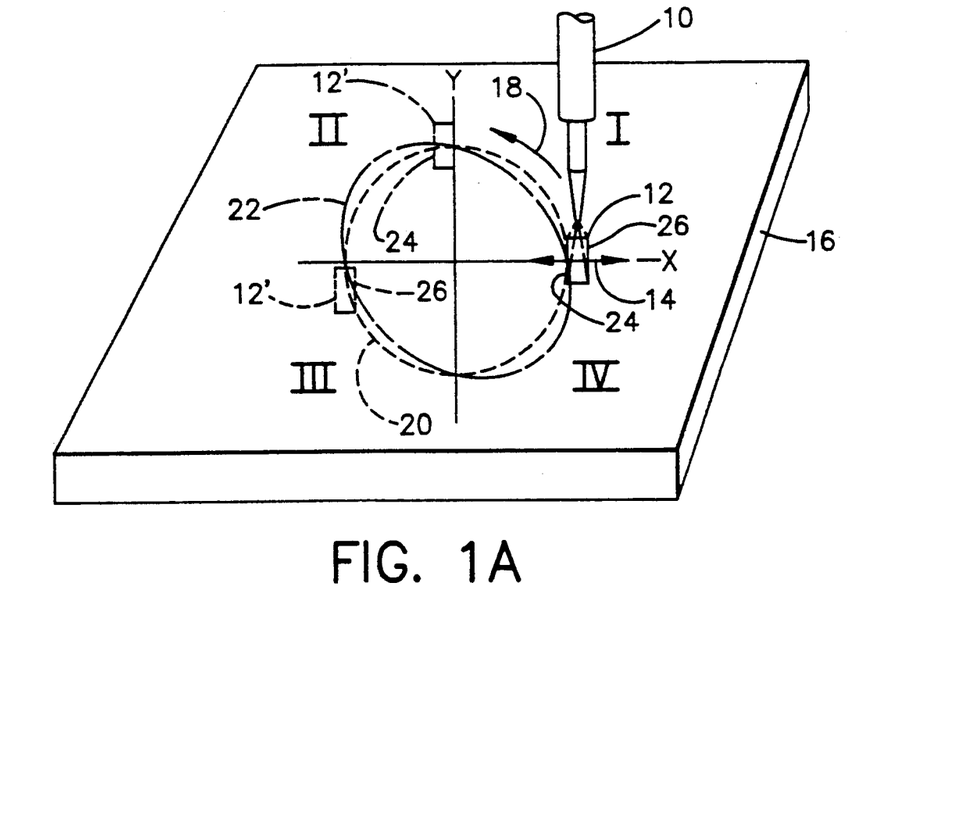
FIG. 1A is an illustration of the difference between a desired trepanning path or laser focus path and an actual or resulting trepanning path caused by a linearly polarized laser beam when the beam is translated in a counterclockwise direction.

A $CO_2$ laser and YAG-type FPL each have linearly polarized beams. While the $CO_2$ laser has a substantially circular beam, the YAG-type FPL 10 has a substantially rectangularly shaped beam 12 or footprint, as shown in FIG. 1, which is linearly polarized in a direction substantially perpendicular to the longest sides of the rectangularly shaped beam 12, as indicated by oppositely pointing arrows 14. The rectangularly shaped laser beam 12 in FIG. 1 is shown to be much larger than the actual beam size for purposes of illustration. In operation, as laser beam 12 or workpiece 16 are moved relative to one another in a counterclockwise direction, illustrated by arrow 18, in a circular path illustrated by broken line 20, the energy of laser beam 12 couples better with the host material of workpiece 16 in the direction of polarization 14. Because the laser energy couples better with the material in the direction of polarization, more energy is absorbed by the host material in the polarization direction. As laser beam 12 moves along cutting or trepanning path 20, the leading faces or sides of rectangular laser beam 12 will couple more into the material and the actual path cut by laser beam 12 will be substantially elliptical as illustrated by chain line 22. The longer and shorter sides of rectangular beam 12 each have distinctly different cutting cross sections; however, whatever the beam orientation, the actual trepanning or cutting path may differ from the path followed by the focal point of the laser beam and the difference between these paths may be more or less severe according to the beam orientation.

For the example shown in FIG. 21, as laser beam 12 is moved arcuately upward along cutting path 20 toward the Y axis in quadrant I, the left longer side 24 of laser beam 12 will actually cut inside of desired cutting path 20 and will actually cut along path 22. Thus, laser face 24 couples or cuts more into the host material in the I and II quadrants and the right longer side 26 of laser beam 12 will couple or cut more into the host material in the III and IV quadrants as shown in phantom 12' in FIG. 1.

Figure 1B:
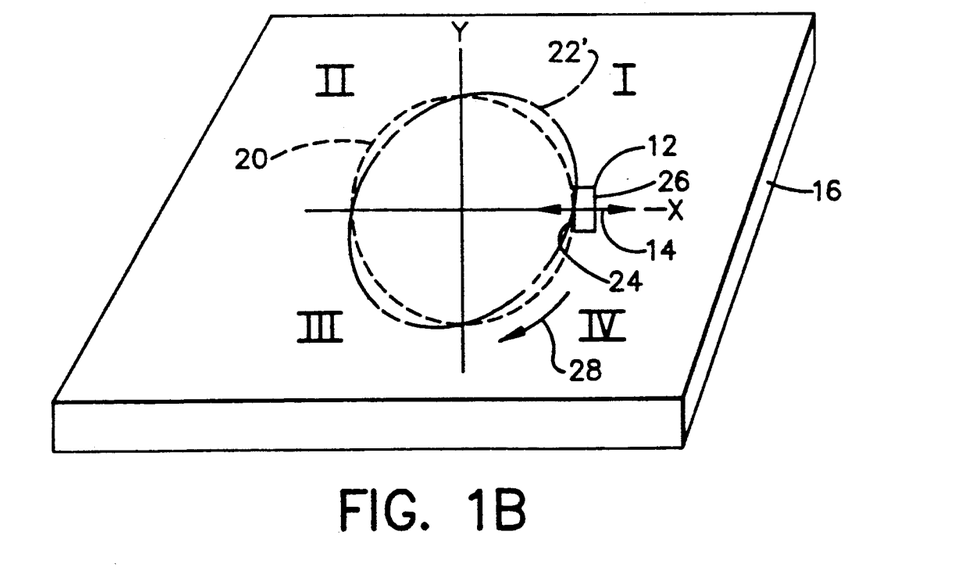
FIG. 1B is an illustration of the difference between a desired trepanning path or laser focus path and an actual or resulting trepanning path caused by a linearly polarized laser beam translated in a clockwise direction.

Similarly, referring to FIG. 1B if the focal point of laser beam 12 is moved in a clockwise direction 28 along circular cutting path 20, the actual path cut or trepanned will be substantially elliptical as shown by chain line 22' except that the major axis of the ellipse will lie in the I and III quadrants and the minor axis will lie in the II and IV quadrants which is opposite to those shown in FIG. 1A. The difference between the desired cutting path 10 or path of the beam focal point and the actual or resulting cutting paths 22 and 22' are exaggerated in FIGS. 1A and 1B for purposes of illustration; however, the ellipticity or difference between the path of the laser beam focal point and the actual path cut may be undesirable, particularly in the manufacture of gas turbine engines and other aerospace vehicle engines where precise tolerances are required.

While the examples shown in FIGS. 1A and 1B were explained using a YAG-type FPL, because the $CO_2$ laser also has a linearly polarized beam, it may also result in an actual cutting or trepanning path which is different from the path followed by the focal point of the laser beam during a drilling or machining operation. The rectangular shape of the YAG-type FPL may, however, compound the difference between these paths because each face of the rectangular beam has a distinctly different cutting cross section. Additionally, while the asymmetrical cutting characteristics of a linearly polarized laser beam where described in FIGS. 1A and 1B with respect to drilling a substantially circular hole, those skilled in the art will recognize that a linearly polarized laser beam can also cause inaccuracies in drilling or machining precision holes or features in a workpiece surface which have a shape other than circular.

The adverse effects of a linearly polarized laser beam can be diminished to some extent by passing the linearly polarized laser beam 12 through a quarter wave plate or lens (not shown in FIGS. 1A and 1B) to convert the linearly polarized laser beam 12 to a beam having a polarization of a random format. The lens, however, will cause some reflection and diffraction of the laser beam which will cause loss of some energy for performing the cutting or trepanning operation. The method of the present invention eliminates the need for a quarter wave plate or any other intermediate optical devices between the laser system and the workpiece, and the present invention actually takes advantage of the asymmetrical cutting characteristics of the linearly polarized FPL or $CO_2$ laser as described hereinabove to provide higher material processing rates.

A prior art method and device for producing bores or holes of substantially circular cross section in workpieces, particularly in watch jewels, by means of a laser beam, is disclosed in U.S. Pat. No. 3,576,965, issued to Gugger. Gugger, however, discloses a glass disc mounted in an inclined position of engagement within a tube. During operation of the device, the tube and disc are rotated about a central axis which is congruent with the direction of propagation of a laser beam within the tube. The inclined disc causes the laser beam propagating through the tube to be diffracted from the central axis and as the tube rotates about the central axis the diffracted laser beam will also rotate along a circular path around the central axis. The glass disc adds distortion to the laser beam and will cause some reflection of the beam resulting in loss of laser energy for performing cutting at the workpiece. Additionally, Gugger does not teach or suggest how to compensate for the asymmetrical cutting characteristics of a linearly polarized laser such as a FPL or $CO_2$ type laser, if such a laser were to be used with the device of Gugger. The device and method disclosed by Gugger may even exaggerate the asymmetrical cutting characteristics if used with a linearly polarized laser. Gugger is also limited with respect to the depth and diameter of the hole or bore which can be produced because the workpiece and device basically remain stationary relative to one another and only the tube and glass disc are rotated in a fixed location to cause diffraction of the laser beam and rotation of the beam about the central axis. Thus, the diameter of the hole drilled by Gugger will be limited by the size of the glass disc and the degree of inclination of the disc. Additionally, the hole depth will be limited because of the divergence of the laser beam as the hole gets deeper.

Another method and apparatus for trepanning a workpiece using laser energy is disclosed in U.S. Pat. No. 4,896,944, issued to Irwin et al. Irwin discloses directing a collimated beam of laser energy onto a workpiece and shifting and rotating a focusing lens to cause the collimated laser beam to orbit a focal point on the workpiece to change the trepanning diameter of the hole being bored. Irwin also does not teach or suggest how to correct for the asymmetrical cutting characteristics caused by a linearly polarized laser beam, if a linearly polarized laser beam is used with Irwin. As with Gugger, the device and method of Irwin may even exaggerate the asymmetrical cutting characteristics if the Irwin apparatus and method are used with a FPL or a $CO_2$ laser which both generate a linearly polarized laser beam. Additionally, the focusing lens of Irwin causes the laser beam to diffract and will add distortion to the beam which causes loss of laser energy incident upon the workpiece for performing cutting and thereby reduces the efficiency of the laser. Furthermore, the apparatus and method of Irwin are also limited with respect to the diameter and depth of a hole which can be produced because the apparatus and workpiece basically remain stationary and the laser beam is rotated by rotation of the focusing lens. Therefore, the hole diameter is limited by the size of the focusing lens and the extent to which the focusing lens is permitted to travel to its offset positions within the nozzle housing of the laser apparatus.

A further device for trepanning a hole in a workpiece using laser energy is disclosed in Japanese Patent No. 1-228692(A). The English abstract of the Japanese patent discloses that the laser beam is reflected by first, second and third rotating reflection plates to bore a hole of a selected diameter through a workpiece without rotating the workpiece. The English abstract of the Japanese patent does not teach or suggest correction of the asymmetrical cutting characteristics if a linearly polarized laser beam is used with the apparatus disclosed. Additionally, the three rotating reflection plates will introduce losses which will reduce the amount of laser energy incident upon the workpiece for performing the boring operation and therefore reduce the cutting speed and depth of the cut taken by each pulse of the laser. The diameter of the hole bored is also limited by the size of the reflection plates.

In summary, there prior art devices and methods have limitations, particularly if used with a linearly polarized laser beam, and appear to only provide for movement of the laser beam in a single rotational direction and are limited to circular cutting paths.

In a standard laser trepanning operation to cut a large diameter hole, much larger than the focal point of the laser beam, through a piece of material having a thickness greater than about 0.5", the laser beam is initially focused at one location on the workpiece and the laser beam is continuously pulsed to drill a single hole, about the size of the laser beam footprint, completely through the workpiece by percussion. After drilling completely through the workpiece then either the laser apparatus or the workpiece are moved relative to one another so as to bore out another portion of material immediately adjacent and adjoining the hole previously bored. In this manner, either the laser apparatus or the workpiece are stepped relative to one another, in the same direction, as successive portions of material are drilled out around a plug of material which will fall out after the last portion of material is removed to form a large diameter hole through the workpiece. This method for forming a large diameter hole is referred to as a single pass cutting method and is not limited to circular shaped holes. Because either the laser apparatus or the workpiece can be moved relative to one another, allowances for the nonsymmetrical cutting characteristics of an FPL or a $CO_2$ laser can be made; however, because the laser beam remains stationary at each location as each successive portion of material is drilled out by the laser beam, a heat-affected zone may be created around the location where the laser beam is incident upon the workpiece. High heat can be produced in the heat-affected zone which can thermally damage the host material by changing the grain structure or mechanical properties of the material and an undesirable increase in recast material may form around the boundary of the large dimension hole which may require subsequent processing steps to remove. This laser trepanning method also has a limited processing rate because the relative travel speed of the laser or component along the prescribed cutting or trepanning path is restrained to a speed which will allow the laser to maintain complete breakthrough of the component material. The travel speed may be as low as about 0.05 inches per minute (IPM) for a superalloy material, such as Rene' 88, a nickel-aluminide or the like, having a thickness of about 1".

SUMMARY OF THE INVENTION

It is, accordingly, a primary object of the present invention to provide a novel method and apparatus for laser trepanning which is not subject to the foregoing disadvantages.

It is another object of the present invention to provide a novel method and apparatus which compensates for the asymmetrical cutting characteristics of a linearly polarized laser beam.

It is a further object of the present invention to provide a novel method and apparatus for laser trepanning that is limited only by the size of the machine tool manipulator controlling the movement of either the laser system, the workpiece or both, with respect to the size, cross-sectional geometry or depth of a passage or channel drilled within a workpiece.

It is yet another object of the present invention to provide a novel method and apparatus for laser trepanning which will reduce the possibility for thermally damaging the host material of the workpiece.

In accordance with the present invention, a method for trepanning a passage through a workpiece, includes the steps of: (a) providing a linearly polarized beam of laser energy; (b) focusing the laser beam on a selected location on the workpiece; (c) moving the laser beam, the workpiece, or both relative to one another along a first selected trepanning path to cause material to be removed from the workpiece by the laser energy; (d) moving one of the laser beam, the workpiece, or both relative to one another along a second selected trepanning path to cause additional material to be removed from the workpiece by the laser energy, the second selected trepanning path being substantially opposite in direction to the first selected path to compensate for the linear polarization of the laser beam and to reduce the processing time; and (e) repeating steps (c) and (d) until the passage is cut through the workpiece. An apparatus for accomplishing the method of the present invention includes lasing means for generating a linearly polarized beam of laser energy and manipulator means for moving one of the lasing means, the workpiece or both relative to one another. The apparatus also includes means for controlling the manipulator means to move either the lasing means, the workpiece or both along a first selected trepanning path and along a second selected trepanning path to cause material to be removed from the workpiece. The second selected trepanning path is substantially opposite in direction to the first selected path to compensate for the linear polarization of the laser beam and to reduce the processing time.

These and other objects of the invention, together with features and advantages thereof, will become apparent from the following detailed specification when read with the accompanying drawings in which like reference numerals refer to like elements.

DETAILED DESCRIPTION OF THE PREFERRED EMBODIMENT

Figure 2:
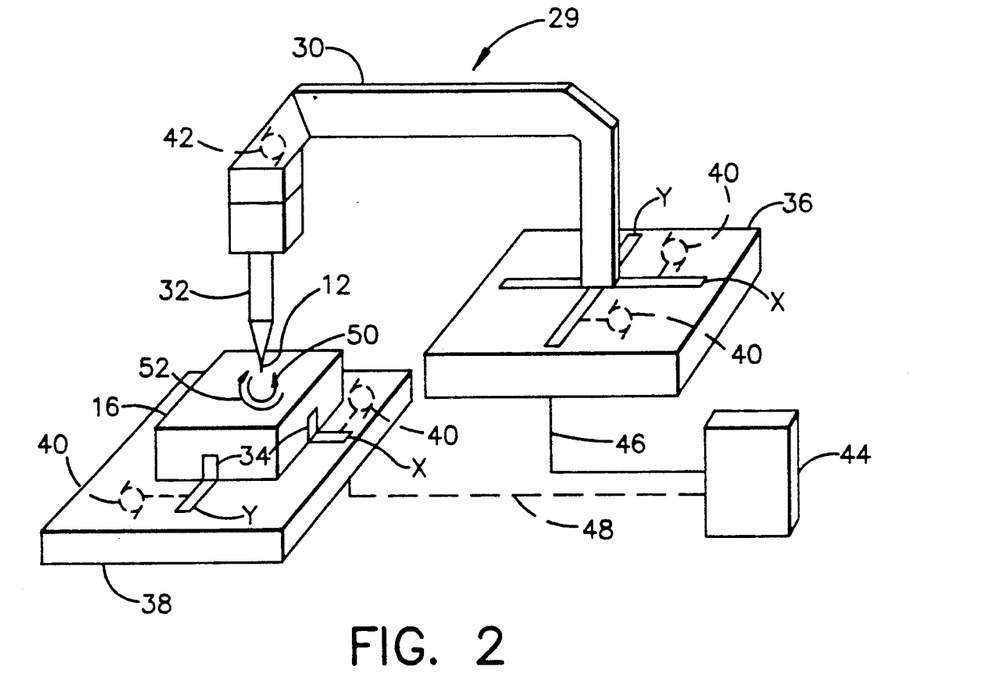
FIG. 2 is a schematic diagram of a multi-pass laser trepanning apparatus in accordance with the present invention.

Referring initially to FIG. 2, an apparatus 29 for performing multi-pass laser trepanning includes a laser system 30 for generating a low divergence, linearly polarized laser beam 12 having a power between about 50 watts and about 1,000 watts. Laser system 30 is preferably a yttrium-aluminum-garnet (YAG) type face-pumped laser, although a $CO_2$ laser or other type laser which generates a low divergence, linearly polarized laser beam may be used. Laser system 30 includes a nozzle 32 for focusing the laser beam 12 onto a selected location on the surface of workpiece 16. Workpiece 16 is preferably held in place by a fixture means 34. Either laser system 30, fixture means 34 or both are mounted to a manipulator means 36 or 38 for moving or translating either the laser beam 12 or the workpiece 16 relative to one another to perform the laser trepanning method in accordance with the present invention. Manipulator means 38 is shown in phantom attached to fixture means 34 because manipulator means 38 may not be needed if manipulator means 36 is provided to move the laser beam 12. Manipulator means 36 or 38 include servomotors 40 for moving either the laser system 30 or the workpiece 16 along at least two linear axes of motion X and Y. Laser system 30 also includes servomotors 42 which permit manipulation of laser nozzle 32 along at least three axes of linear motion to permit translation or movement of the laser beam 12 relative to workpiece 16. Manipulator means 36 and 38 and fixture means 34 are known components of a laser material processing system, such as apparatus 29, and may be a model HP205 machine tool/laser system as manufactured by S. E. Huffman, Inc.

A computer controller 44 is electrically connected to laser system 30 and manipulator means 36 by a communications link 46 and may be connected to manipulator means 38 by a communications link 48 if manipulator means 38 is provided. In accordance with the present invention, computer controller 44 contains program means or software to move or translate either the laser beam 12 or the workpiece 16 relative to one another along a first selected trepanning path, illustrated by arrow 50 and then moving either the laser beam 12 or the workpiece 16 along a second selected trepanning path, illustrated by arrow 52 to cause additional material to be removed from the workpiece 16 by the laser energy. The second selected trepanning path 52 is substantially opposite in direction to the first selected path 50 to compensate for the linear polarization of the face-pumped laser beam 12 and to reduce the processing time.

Figure 3A:
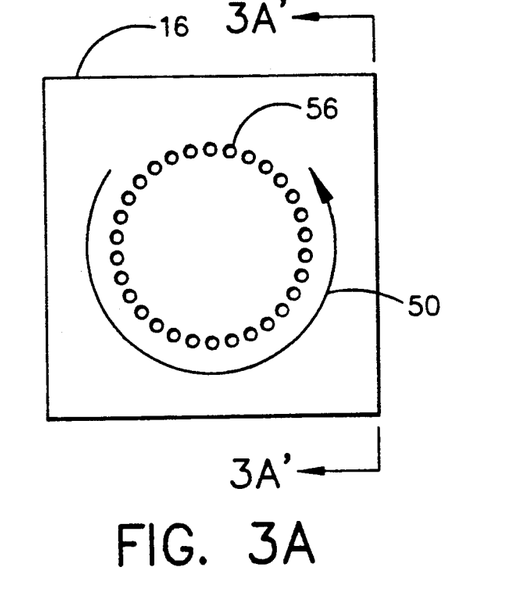
FIGS. 3A-3D and 3A'-3D' illustrate the laser trepanning method in accordance with the present invention.

FIGS. 3A-3D and 3A'-3D' illustrated in detail the laser trepanning method in accordance with the present invention for boring a large diameter passage 54 (FIG. 3D) through workpiece 16. In FIGS. 3A and 3A' the laser beam is moved in a substantially circular counterclockwise trepanning path 50 as laser system 30 is pulsed at a frequency of between about 5 and about 20 pulses per second (pps) to form a multiplicity of voids or holes 56 partially through workpiece 16. The depth of each of holes 56 will be a function of the laser power, and the power is maintained at a sufficiently low level so as to minimize or substantially avoid thermal damage to the host material of workpiece 16, such as alteration of the grain structure or other mechanical properties of the material in the heat-affected zone caused by the laser energy, which could result in a failure of the workpiece 16 or component of a gas turbine engine. Additionally, the laser power is maintained at a low level to minimize the amount of recast material which may collect around the boundary of passage 54 and which would, therefore, require additional processing steps to provide a clean hole, such as that required for a film cooling hole or the like through a gas turbine engine component.

Figure 3B:
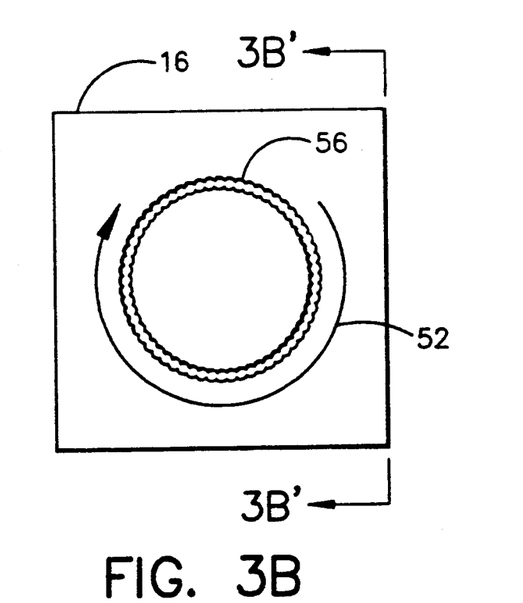
Figure 3C:
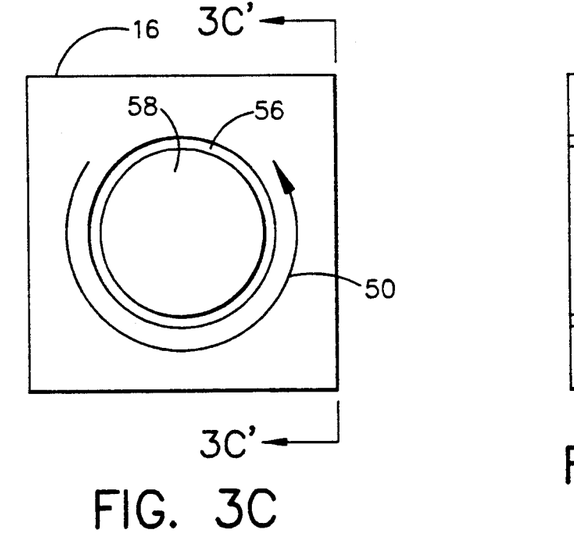
Figure 3D:
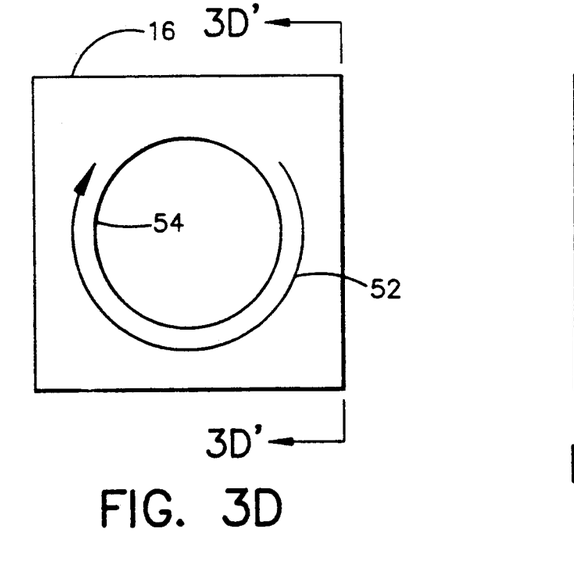

In accordance with the present invention, laser beam 12 is then translated or moved in an opposite laser trepanning path 52 to cut the holes or voids 56 deeper into workpiece 16 as shown in FIGS. 3B and 3B'. This process of moving laser beam 12 in repetitive cycles, back and forth in clockwise and counterclockwise directions over substantially the same laser trepanning paths will eventually drill completely through workpiece 16, as shown in FIGS. 3C and 3C', leaving a plug of material 58 which can be removed to form passage 54 as shown in FIGS. 3D and 3D'. Additional translations in the clockwise and counterclockwise directions can be made, if necessary, to further clean the hole or passage 54. Depending upon the thickness of workpiece 16 and the laser power, which determines the depth of cut of the laser beam, it may take as many as about 50 to about 100 clockwise and counterclockwise translations of laser beam 12 to completely form passage 54 through workpiece 16.

Figure 4:
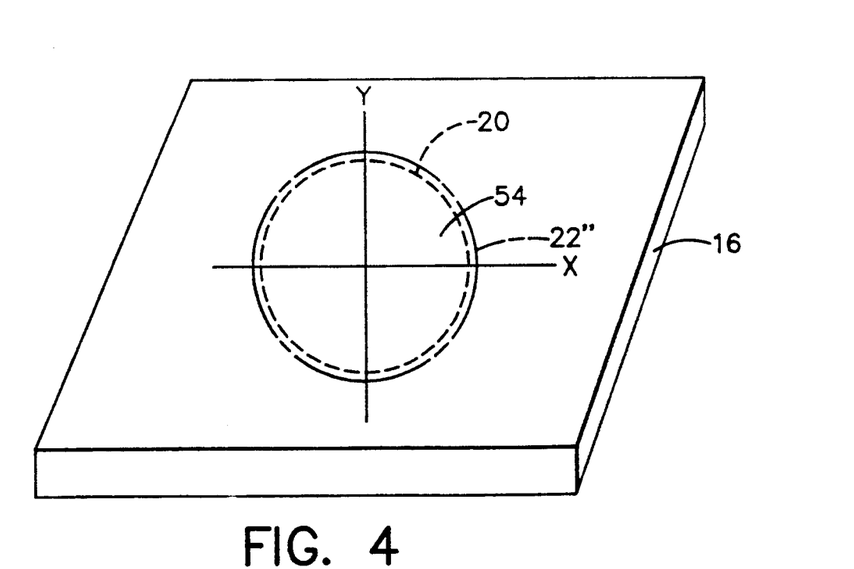
FIG. 4 is an illustration of the laser focus path and the actual or resulting laser trepanned path in accordance with the multi-pass laser trepanning method of the present invention.

Referring now to FIG. 4, broken line 20 illustrates the circular laser trepanning path or laser focus path during each of the clockwise and counterclockwise translations of laser beam 12 to form passage 54 in FIGS. 3A-3D. The actual or resulting boundary of passage 54 is illustrated by chain line 22". Comparing chain line 22" of FIG. 4 with chain lines 22 and 22' of FIGS. 1A and 1B, respectively, those skilled in the art will recognize that by translating or moving the laser beam in substantially opposite trepanning paths 50 and 52, the asymmetrical cutting caused by the linearly polarized FPL beam 12 is compensated and a substantially circular passage 54 can be trepanned without directing laser beam 12 through intermediate optics or otherwise mechanically compensating for the linear polarization of the laser beam 12. Additionally, the method of the present invention takes full advantage of the improved coupling or cutting of the host material caused by the linear polarization which results in higher material processing rates than previously realized.

While the present invention has been described with respect to laser trepanning a passage 54 which has a substantially circular cross section, those skilled in the art will recognize that the method of the present invention can also be applied to trepan passages having other geometric cross sections, such as triangular, trapezoidal or the like. The computer controller 44 may also be programmed to adjust the substantially oppositely directed trepanning paths between one or more subsequent cutting cycles to form a passage that is tapered or has a variable cross section along its depth.

Figure 5:
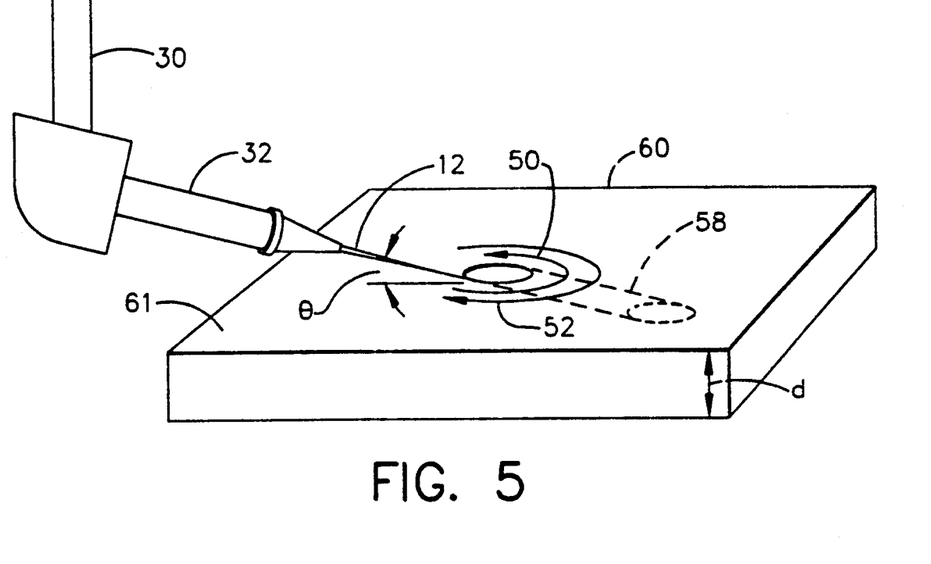
FIG. 5 is an illustration of laser trepanning a film cooling hole through a stationary air seal of a gas turbine engine in accordance with the present invention.

As an example of the present invention, referring to FIG. 5, a film cooling hole 58 may be formed in a stationary air seal 60 or other component of a gas turbine engine by directing FPL beam 12 onto a predetermined location on the surface 61 of component 60 at a selected angle theta, preferably about 15° relative to the surface 61 of air seal 60. In accordance with the present invention, laser beam R is then translated repeatedly along counterclockwise and clockwise trepanning paths 50 and 52 to trepan film cooling hole 58 through air seal 60.

The FPL beam 12 may be directed sequentially onto a number of different predetermined locations on the surface 61 of the component 60 to form a plurality of film cooling holes in the component 60 using the multi-pass laser trepanning method of the present invention. The plurality of film cooling holes may also be formed by providing a plurality of linearly polarized laser beams each focused on a different predetermined location on the component 60.

Air seal 60 may be made from a superalloy, such as Inconel 718 or the like, and may have a thickness "d" of about 0.25" which at a trepanning angle of about 15° corresponds to an effective depth of about 1" for an aft stationary air seal on certain high performance gas turbine engines. About 50 to about 75 translations or passes of laser beam 12 at a travel speed between about 5" to about 50" per minute (IPM) may be required to trepan completely through air seal 60 at a laser power of about 320 watts average power.

Figure 6:
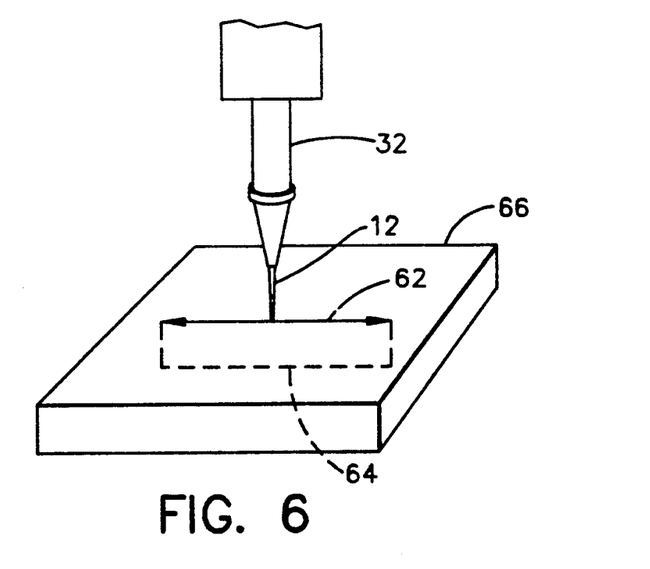
FIG. 6 illustrates performing a linear cutting operation in accordance with the multi-pass laser trepanning method of the present invention.

Referring to FIG. 6, as a further example of an application of the multi-pass laser trepanning method of the present invention, in the manufacture of gas turbine engines, it may be necessary to split the case of a compressor stator 66. This involves about an 18" to about a 48" linear cut at a depth of about 0.2" to about 2". This cut may be formed by translating laser beam 12 forward and back over the same laser trepanning path as illustrated by double arrow 62 in FIG. 6 to form a linear cut 64 through the compressor stator case 66.

Those skilled in the art will recognize that the present invention may be used to extend the capabilities of any laser system by providing a means for cutting holes of various sizes and shapes through thicker, harder materials at a relatively faster rate compared to a conventional single pass cutting method.

The multi-pass trepanning process of the present invention is easily adaptable for utilization with different part programs for cutting a specific feature in a component or workpiece; for example, a part program may be modified by adding or minimizing a taper being cut in a portion of a workpiece by respectively growing or shrinking the trepanning path or geometry on a subsequent pass or group of passes of the laser beam. A feature or passage can, therefore, be formed in a component having a selected taper or variable cross section or diameter along its depth by adjusting the trepanning path on subsequent passes or groups of passes of the laser beam.

It will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for trepanning a passage through a workpiece, comprising the steps of:
    (a) providing a linearly polarized beam of laser energy;
    (b) focusing the laser beam on a selected location on the workpiece;
    (c) moving at least one of the laser beam and the workpiece relative to one another along a first selected trepanning path to cause material to be removed from the workpiece by the laser energy;
    (d) moving at least one of the laser beam and the workpiece relative to one another along a second selected trepanning path to cause additional material to be removed from the workpiece by the laser energy, the first and second selected trepanning paths being substantially opposite in direction to each other, to compensate for the linear polarization of the laser beam; and (e) repeating steps (c) and (d) until the passage is cut through the workpiece.

2. The method of claim 1, wherein the first and second selected trepanning paths define a circle with a selected radius.

3. The method of claim 2, further comprising the step of selecting a laser focus path to compensate for the linear polarization of the laser beam and to provide a substantially circular passage of a selected radius.

4. The method of claim 1, wherein the first and second selected trepanning paths are linear.

5. The method of claim 1, wherein the first and second selected trepanning paths form a passage having a selected geometric cross section.

6. The method of claim 1, wherein the laser energy is at a level to avoid thermal damage to the workpiece and excess recast material.

7. A method of claim 1, wherein at least one of the laser beam and the workpiece are moved relative to one another at a speed to prevent thermal damage to the material.

8. The method of claim 1, wherein step (e) further comprises the step of selectively adjusting the first and second trepanning paths to form a passage with a variable cross section along its length.

9. A method for trepanning a passage through a gas turbine engine component, comprising the steps of:
(a) providing a linearly polarized beam of coherent laser energy;
(b) focusing the laser beam on a selected location on the component;
(c) moving at least one of the laser beam and the component relative to one another along a first selected trepanning path to cause material to be removed from the component by the laser energy;
(d) moving at least one of the laser beam and the component relative to one another along a second selected trepanning path to cause additional material to be removed from the workpiece by the laser energy, the first and second selected trepanning paths being substantially opposite in direction to each other, to compensate for the linear polarization of the laser beam; and
(e) repeating steps (c) and (d) until the passage is cut through the component.

10. The method of claim 9, wherein the laser beam is incident upon a surface of the component at a selected angle relative to the surface to form an angled passage through the component.

11. The method of claim 9, wherein the passage is a film cooling hole.

12. The method of claim 9, wherein the passage is a film cooling hole in an air seal of a gas turbine engine.

13. The method of claim 9, further comprising the steps of:
focusing the laser beam sequentially on a plurality of predetermined locations on the component; and
repeating steps (c)-(e) at each predetermined location to form a plurality of passages through the component.

14. The method of claim 13, wherein the passages are film cooling holes.

15. The method of claim 9, further comprising the steps of:
providing a plurality of linearly polarized beams of coherent laser energy;
focusing each beam on a different predetermined location on the component;
performing steps (c)-(e) for each beam to form a plurality of passages.

16. The method of claim 9, wherein the first and second selected trepanning paths define a circle with a selected radius.

17. The method of claim 9, further comprising the step of selecting a laser focus path to compensate for the linear polarization of the laser beam and to provide a passage having a selected geometric cross section.

18. The method of claim 9, wherein the first and second selected trepanning paths are linear.

19. The method of claim 18, wherein the component is a compressor stator case of a gas turbine engine.

20. The method of claim 9, wherein step (e) further comprises the step of selectively adjusting the first and second trepanning paths to form a passage with a variable cross section along its length.

21. An apparatus for trepanning a passage through a workpiece, comprising:
laser means for generating a linearly polarized beam of laser energy;
manipulator means for moving at least one of said lasing means and the workpiece relative to one another; and
means for controlling said manipulator means to move at least one of said lasing means and the workpiece along a first selected trepanning path and along a second selected trepanning path to cause material to be removed from the workpiece, said first and second selected trepanning paths being substantially opposite in direction to one another to compensate for the linear polarization of the laser beam.

22. The apparatus of claim 21, wherein said first and second selected trepanning paths define a passage in a gas turbine engine component.

23. The apparatus of claim 21, wherein the first and second trepanning paths are linear.

24. The apparatus of claim 23, wherein the workpiece is a compressor stator case of a gas turbine engine, said case being split when at least one of said case and said beam of energy from said lasing means is moved along said first and second selected trepanning paths.

25. The apparatus of claim 21, wherein the workpiece is a gas turbine engine component, a film cooling hole being formed in said component when at least one of said component and said beam of energy is moved along said first and second selected trepanning paths.

26. The apparatus of claim 21, wherein said controlling means causes said at least one of said lasing means and the workpiece to be moved repetitively along said first and second trepanning paths a sufficient number of cycles to form the passage through the workpiece and said apparatus further comprising means for selectively adjusting said first an second trepanning paths before at least one subsequent cycle to form a passage with a variable diameter along its length.

27. The method of claim 1, wherein the laser beam is moved along the first and second selected trepanning paths by manipulation of a nozzle for a laser system.

* * * * *